No. 624,108. Patented May 2, 1899.
J. H. SHERMAN.
COMBINED COLLAR BUTTON AND NECKTIE FASTENER.
(Application filed Jan. 11, 1899.)

(No Model.)

Witnesses
S. E. Zimmerman
W. J. Norton

Inventor
Jesse H. Sherman
By Britton Gray
his Attorneys

UNITED STATES PATENT OFFICE.

JESSE H. SHERMAN, OF DENVER, COLORADO.

COMBINED COLLAR-BUTTON AND NECKTIE-FASTENER.

SPECIFICATION forming part of Letters Patent No. 624,108, dated May 2, 1899.

Application filed January 11, 1899. Serial No. 701,787. (No model.)

*To all whom it may concern:*

Be it known that I, JESSE H. SHERMAN, a citizen of the United States, residing at Denver, in the county of Arapahoe and State of Colorado, have invented certain new and useful Improvements in a Combined Collar-Button and Necktie-Fastener; and I do hereby declare the following to be a full, clear, and exact description of the invention, such as will enable others skilled in the art to which it appertains to make and use the same.

This invention is directed to an improved combined collar-button and necktie-fastener, and contemplates the production of a device of this character possessing advantages in point of simplicity and durability of construction, cheapness of manufacture, and efficiency in operation. Further advantages lie in the facility with which the separable parts may in use be assembled and disconnected and in the readiness with which the collar may be secured and the tie adjusted to its proper position.

The nature of the invention will be understood by reference to the following detailed description and to the accompanying drawings, in which—

Figure 1:
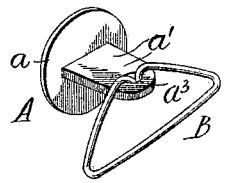
Figure 2:
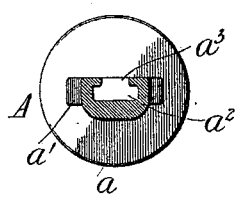
Figure 3:
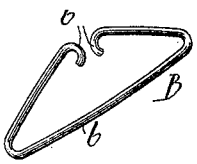

Figure 1 is a perspective view of my improved combined collar-button and necktie-fastener. Fig. 2 is an enlarged transverse sectional view through the socketed end of the button. Fig. 3 is a perspective view of the necktie-fastener detached from the button.

Referring to the drawings by letter, A denotes the button, and B the necktie-fastener. The button consists of a back $a$ of disk form and a flat shank $a'$. Near the outer end of the shank is a socket $a^2$, (shown more particularly in Fig. 2,) which socket is transversely enlarged below the opening $a^3$ thereof, said opening being preferably circular.

The necktie-fastener is constructed of wire, a single length of this material being bent to form a loop $b$ and to provide ends $b'$ $b'$, which extend inwardly and are oppositely curved to engage the sides of the socket $a^2$ in the button-shank $a'$.

In practice the button is inserted in the front hole in the neckband of the shirt, the shank extending outwardly, with the opening $a^3$ of the socket uppermost. The ends of the collar are then secured by being pressed onto the shank, after which the ends of the loop or fastener are caused to engage the shank-socket, bringing said loop into position below the shank and at right angles to the latter, as indicated in Fig. 1. The loop is of spring metal, which allows of its being partially collapsed to enable the ends $b'$ to enter the contracted opening of the socket and of regaining its normal dimensions to cause said ends to engage by a spring action the end walls of the socket below the opening when inserted. The loop when attached forms a stop against the accidental disconnection of the collar ends and also provides a retaining device for the tie, one end of which latter is passed through the loop previous to the formation of the bow or to any other disposition of the tie ends.

The employment of the flat headless shank for the button greatly facilitates the operation of attaching the collar, as said shank may be easily and quickly threaded through the holes provided for the purpose. The construction and disposition of the loop ends and the peculiar form of the socket therefor enables the attachment of the loop to be readily performed, after which it is an easy matter to pass one end of the tie through the depending loop.

The device consists of but two parts, each of which is very simple in construction, cheap to produce, and not liable to disorder. The device, moreover, is very efficient in operation, and the time and labor incidental to its adjustment are the minimum.

I claim as my invention—

1. A combined collar-button and necktie-fastener comprising a button the shank of which is provided centrally toward its outer end with a socket having a contracted opening, and a separable loop of spring metal the ends of which are formed to removably engage the socket, substantially as described.

2. A combined collar-button and necktie-fastener comprising a button having a headless flat shank provided centrally near its outer end with a socket the opening of which is contracted, and a separable loop of spring metal the ends of which are brought toward each other and oppositely bent to engage opposite sides of the socket below the opening, substantially as described.

In testimony whereof I affix my signature in presence of two witnesses.

JESSE H. SHERMAN.

Witnesses:
JOHN H. SCHULTZ,
LEWIS B. JOHNSON.